United States Patent [19]

Hayashi et al.

[11] Patent Number: 4,870,639
[45] Date of Patent: Sep. 26, 1989

[54] PACKET SWITCHING SYSTEM

[75] Inventors: Kentaro Hayashi; Hiroshi Kimura, both of Tokyo, Japan

[73] Assignee: Oki Electric Industry Co., Ltd., Tokyo, Japan

[21] Appl. No.: 287,092

[22] Filed: Dec. 21, 1988

[30] Foreign Application Priority Data

Dec. 22, 1987 [JP] Japan .................................. 62-322735

[51] Int. Cl.$^4$ .......................... H04Q 11/04; H04J 3/14
[52] U.S. Cl. .......................................... 370/60; 370/14
[58] Field of Search ............................... 370/60, 14, 94

[56] References Cited

U.S. PATENT DOCUMENTS

| | | | |
|---|---|---|---|
| 4,679,190 | 7/1987 | Dias et al. | 370/60 |
| 4,734,907 | 3/1988 | Turner | 370/60 |
| 4,745,593 | 5/1988 | Stewart | 370/60 |

FOREIGN PATENT DOCUMENTS 2620220  4/1980  Fed. Rep. of Germany .
3728805  5/1988  Fed. Rep. of Germany .
3740338  6/1988  Fed. Rep. of Germany .

OTHER PUBLICATIONS

"Path Selection and Path Conflict for a Class of Basic Interconnection Networks" Shibusawa, Journal of Electronics and Communications Engineers of Japan, vol. J 69-D, No. 3, Mar. 86, pp. 312-323.

*Primary Examiner*—Douglas W. Olms
*Attorney, Agent, or Firm*—Spencer & Frank

[57] ABSTRACT

A self-routing packet-switching network is equipped with a first-in-first-out input queue at each external input terminal and an address checker at each external output terminal. Packets are deleted from the input queues only in response to acknowledge signals from the address checkers, indicating reception at the correct external output terminal. This arrangement efficiently assures that every packet is sent until it is routed to the correct address.

5 Claims, 2 Drawing Sheets

PACKET SWITCHING SYSTEM

BACKGROUND OF THE INVENTION

This invention relates to a high-speed packet-switching system.

Packet-switched networks are widely employed in data communications because they economically utilize communication channel resources; they require the sending and receiving terminals to be connected only when data are actually being transmitted, not during the idle periods between transmissions. Specifically, data are transmitted in packets, each containing the address of the receiving terminal. The packet switch in the network must be capable of reading the address in each packet and quickly routing the packet to the correct destination.

One well-known design for a high-speed packet switch employs a self-routing switching network comprising a plurality of 2×2 crosspoint switching elements that operate according to individual bits in the packet address. The switching elements are so interconnected as to ensure that a packet will automatically be routed to the correct address, provided no collisions with other packets occur en route.

A problem with this packet switch design is that when collisions do occur, one of the two colliding packets is routed to the wrong address. A prior-art solution to this problem is to provide a sorting network or trap network to sort or otherwise preprocess the packets before they enter the self-routing switching network. In this way it is possible to ensure that packets destined for different addresses will be routed correctly, without colliding. This scheme does not, however, solve the problem of multiple packets having the same destination address. Such packets still collide, with the result that some of them are routed to the wrong address.

SUMMARY OF THE INVENTION

It is accordingly a purpose of this invention to provide a packet-switching system that efficiently solves the problem of collisions and provides high packet-switching quality by ensuring that every packet reaches the correct address.

A packet-switching system according to this invention comprises a plurality of external output terminals, a plurality of external input terminals for receiving input packets, each packet containing the address of an external output terminal, a self-routing switching network, a plurality of queuing means, one connecting to each external input terminal, for receiving input packets from the external input terminals and temporarily storing them in first-in-first-out queues, for sending the front packets in these queues to the self-routing switching network, and for deleting the front packets from these queues in response to acknowledge signals, and a plurality of address checking means, one connected to each external output terminal, for receiving packets from the self-routing switching network, checking their addresses, and if a packet has been routed to the correct address, sending it on to the connected external output terminal and returning an acknowledge signal via the self-routing switching network to the queuing means.

DETAILED DESCRIPTION OF THE EMBODIMENTS

Figure 1:
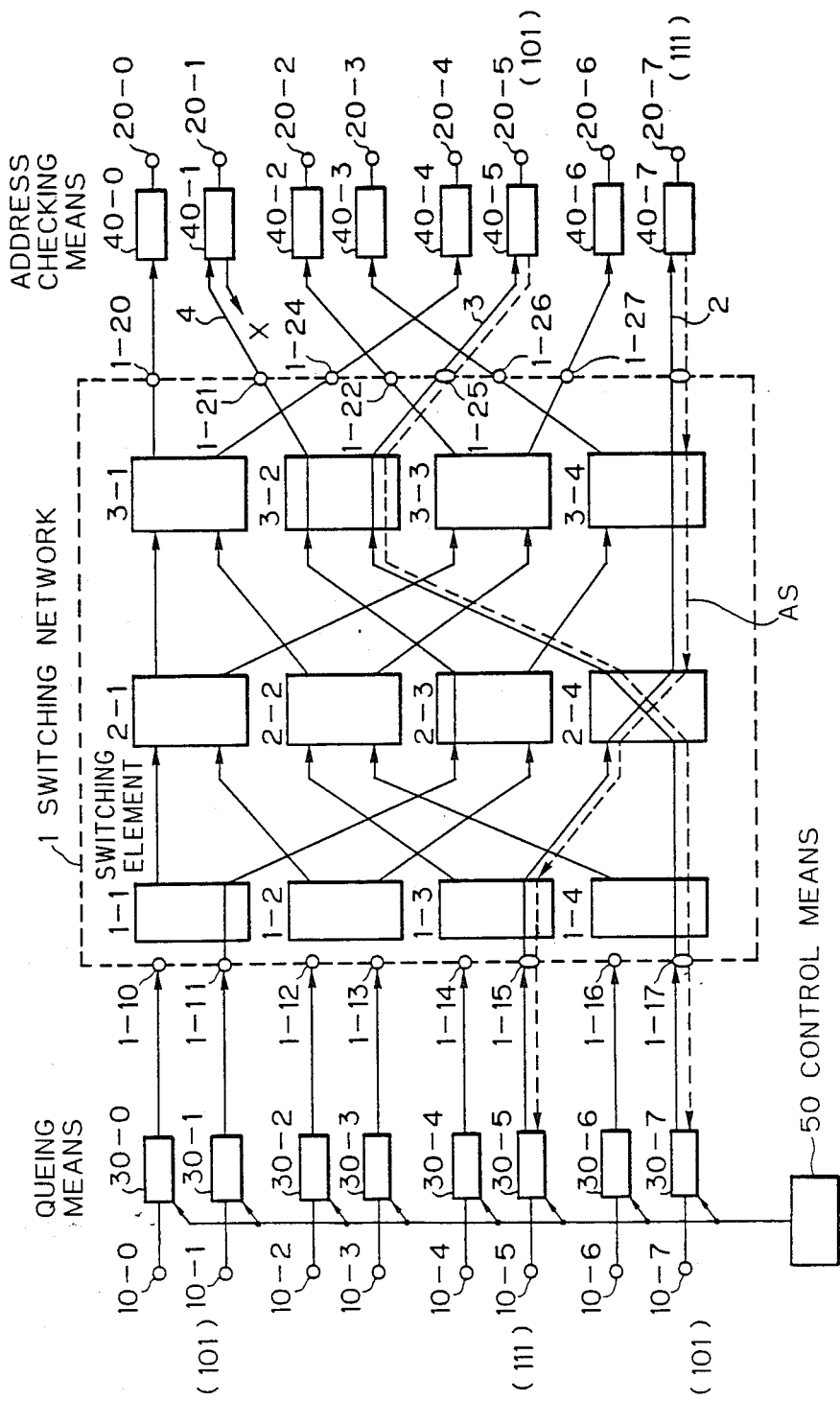
FIG. 1 is a schematic diagram illustrating an embodiment of the present invention.

An embodiment of this invention will be described with reference to the schematic diagram in FIG. 1. FIG. 1 shows a novel packet-switching system comprising a self-routing switching network 1 having a plurality of input terminals 1-10 to 1-17 and a plurality of output terminals 1-20 to 1-27, a plurality of external input terminals 10-0 to 10-7, a plurality of external output terminals 20-0 to 20-7, a plurality of first-in-first-out (FIF0) queuing means 30-0 to 30-7 interposed between the external input terminals 10-0 to 10-7 and the input terminals 1-10 to 1-17 of the self-routing switching network 1, and a plurality of address checking means 40-0 to 40-7 interposed between the output terminals 1-20 to 1-27 of the self-routing switching network 1 and the external output terminals 20-0 to 20-7. The self-routing switching network 1 comprises 2×2 crosspoint switching elements 1-1 to 3-4 that operate autonomously according to individual bits in the packet address information. The switching elements 1-1 to 1-4 operate according to the least significant bit of the packet address, the switching elements 2-1 to 2-4 operate according to the next significant bit, and the switching elements 3-1 to 3-4 operate according to the most significant bit. In other words, the switching elements are arranged in a plurality of stages and the switching elements in the respective stages assume one of the switching states in accordance with the corresponding bit of the address information of the packet input thereto.

Figure 2D:
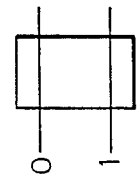
FIGS. 2A through 2D are schematic diagrams illustrating the operation of the switching elements in FIG. 1.
Figure 2C:
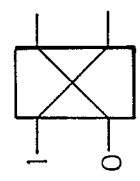
Figure 2B:
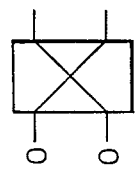
Figure 2A:
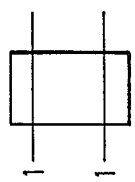

The manner in which the switching elements 1-1 to 3-4 operate is illustrated in FIG. 2A through 2D. Each switching element has two input ports and two output ports, which will be referred to as the upper and lower input and output ports. When a packet is received at one of the two input ports of a switching element, the switching element reads the relevant packet address bit and assumes a state in which said one of the input ports is connected to the upper output port to switch the packet to the upper output port if the bit is a "0," or assumes a state in which said one of the input ports is connected to the lower output port to switch the packet to the lower output port if the bit is a "1." When the switching element receives only one packet, it can always switch the packet in this way. When the switching element receives two input packets simultaneously, if these packets differ in the relevant address bit, the switching element operates as in FIG. 2A and FIG. 2B, thus switching both packets to the correct output port. If the two packets have identical values in the relevant address bit, a condition which is termed a collision, one of the two input ports is connected to the correct output port so that one of the input packets is switched to the correct output port but the other input port is connected to the incorrect output port so that one of the input packets is switched to the incorrect output port, as in FIG. 2C and FIG. 2D. In FIG. 2C and FIG. 2D, the lower packet is switched to the correct output port and the upper packet to the incorrect output port.

Each switching element maintains the state to which it has been brought by an address bit of a packet until another packet is received. The switching elements is capable of bi-directional transfer of signals. Specifically, it permits not only passage of the packets in one direction, from input to output ports, but also passage of acknowledge signals, to be described later, in the other direction, from output to input ports.

The switching elements 1-1 to 3-4 are interconnected according to the well-known self-routing scheme illustrated in FIG. 1. It can easily be verified that, barring collisons, this interconnection scheme always routes a packet to the correct output terminal.

The queuing means 30-0 to 30-7 operate as follows. Each of the queuing means 30-0 to 30-7 comprises a memory apparatus for temporarily storing packets in a first-in-first-out queue. When a packet is received from an external input terminal, it is linked at the back of the queue. At a timing signal TS repeatedly, e.g., periodically produced by a control means 50, if the queue is not empty, the packet at the front of the queue is sent to the self-routing switching network 1, which routes it to one of the output terminals 1-20 to 1-27 and hence to the address checking means 40-0 to 40-7. The same timing signal TS is furnished to all the queuing means 30-0 to 30-7, so that they all send their packets simultaneously. After sending a packet, a queuing means may receive an acknowledge signal AS from one of the address checking means 40-0 to 40-7 via the self-routing switching network 1. when a queing means receives such an acknowledge signal AS, it deletes the front packet from its queue. If a queuing means does not receive such an acknowledge signal, it does not delete its front packet, hence the same packet is sent again at the next timing signal TS.

Each of the address checking means 40-0 to 40-7 checks the address of packet received from the self-routing switching network 1. If a packet has been routed to the correct address, i.e., to the address checking means connected to the external output terminal of the address of the packet, the address checking means sends it on to the external output terminal, and returns an acknowledge signal AS through the self-routing switching network 1 indicating that the packet has been correctly received. Since the switching elements of the self-routing switching network 1 are still in the same state at this point, the acknowledge signal retraces the route of the packet in reverse, reaching the queuing means (one of 30-0 to 30-7) from which the packet originated. If a packet has been routed to an incorrect address, the address checking means does not send it on to the external output terminal, and does not return an acknowledge signal. The front packet in the queuing means is not therefore deleted and is retransmitted when the timing signal TS is next applied to the queuing means.

The operation of this novel packet-switching system will be illustrated for a case in which three packets are input simultaneously, as shown in FIG. 1. A first packet, addressed to the external output terminal 20-7 (binary address 111) is received at the external input terminal 10-5. A second packet, addressed to the external output terminal 20-5 (binary address 101), is received at the external input terminal 10-7. A third packet, also addressed to the external output terminal 20-5, is received at the external input terminal 10-1. It will be assumed that no other packets are present in the system, so these three packets move immediately to the front of the queues in the queuing means 30-1, 30-5, and 30-7 and are sent simultaneously to the self-routing switching network 1.

The first packet is routed along the path 2 via the switching elements 1-3, 2-4, and 3-4 to the address checking means 40-7, which checks its address and finds that it has reached the correct destination. The address checking means 40-7 accordingly sends this packet to the external output terminal 20-7 and returns an acknowledge signal (represented by the dashed line in the drawing) along the path 2 to notify the queuing means 30-5 that the packet has been correctly received. The queuing means 30-5 then deletes this packet from its queue and becomes ready to send another packet the next time.

Similarly, the second packet is routed on the path 3 via the switching elements 1-4, 2-4, and 3-2 to the address checking means 40-5. Since it reaches the correct address, it is sent to the external output terminal 20-5 and an acknowledge signal is returned to the queuing means 30-7, which then deletes this packet from its queue.

The third packet is routed along the path 4 via the switching elements 1-1 and 2-3 to the switching element 3-2, where it collides with the second packet. The result is that the third packet is routed to the wrong address; specifically, it is sent to the address checking means 40-1. Detecting the incorrect address, the address checking means 40-1 does not send this packet on to the external output terminal 20-1, and does not return an acknowledge signal. Thus this packet remains in the queuing means 30-1, and will be sent again the next time.

Since a packet is not deleted until it is received at the correct address, every packet continues to be sent until it reaches its intended destination. Misrouted packets remain in the switching system without being either misdelivered or lost. The novel packet-switching system thereby avoids the inefficiency of prior-art packet-switching systems in which misrouted packets are delivered to the wrong external output terminal, where they are abandoned and must be retransmitted from the external input terminal. The novel packet-switching system thus combines high switching speed with high switching quality.

The scope of this invention is not restricted to the preceding embodiment, but includes many variations and modifications that will be obvious to one skilled in the art. In particular, the self-routing switching network can have a configuration different from that shown in FIG. 1, and the number of input and external output terminals can be varied as required by the size of the packet-switching system.

What is claimed is:

1. A packet-switching system, comprising:
  a plurality of external output terminals;
  a plurality of external input terminals for receiving input packets, each packet contaning address information designating an external output terminal;
  a plurality of storage means respectively associated with the external input terminals;
  a plurality of address checking means respectively associated with the external output terminals;
  said switching network having input terminals respectively associated with the storage means and coupled with the respective external input terminals via the associated storage means, and output terminals respectively associated with the address checking means and coupled to the respective external output terminals via the associated address checking means, said switching network being capable of autonomously routing packets received at any of the input terminals to the output terminal coupled to the external output terminals indicated by the address information of the packet;

each of said storage means receiving input packets from the associated external input terminal and temporarily storing them, and sending the stored packets to the associated input terminal of said switching network; and each of said address checking means receiving packets from said switching network, checking the addresses of said packets, and, if a packet which it has received has an address information designating the associated external output terminal, sending said packet on to the associated external output terminal and returning an acknowledge signal via said switching network to said storage means;

said storage means deleting the stored packets in response to said acknowledge signal.

2. A system according to claim 1, further comprising a control means repeatedly delivering a timing signal to all the storage means, said storage means being responsive to the timing signal for transmitting the storaged packet to the switching network.

3. A system according to claim 2, wherein each of said storage means comprises a queuing means, which stores the packets from said external input terminals in first-in-first-out queues, sends the front packets in said queues to said switching network responsive to said timing signal, and deletes the front packet from said queues in response to said acknowledge signal.

4. A system according to claim 1, wherein said switching network comprises a plurality of switching elements each of which autonomously assumes one of its switching states responsive to the address information of the packet input thereto, maintains said one of the states until another packet is received, and is capable of permitting passage of the packets in one direction, and permitting passage of the acknowledge signals in the opposite direction.

5. A system according to claim 4, wherein the switching elements in the switching network are arranged in a plurality stages and each of the switching elements in the respective stages assumes said one of its switching stages responsive to the respective bit of the address information of the packets input thereto.

* * * * *